J. Roberts,
Land Marker.
No. 94,032.   Patented Aug. 24. 1869.
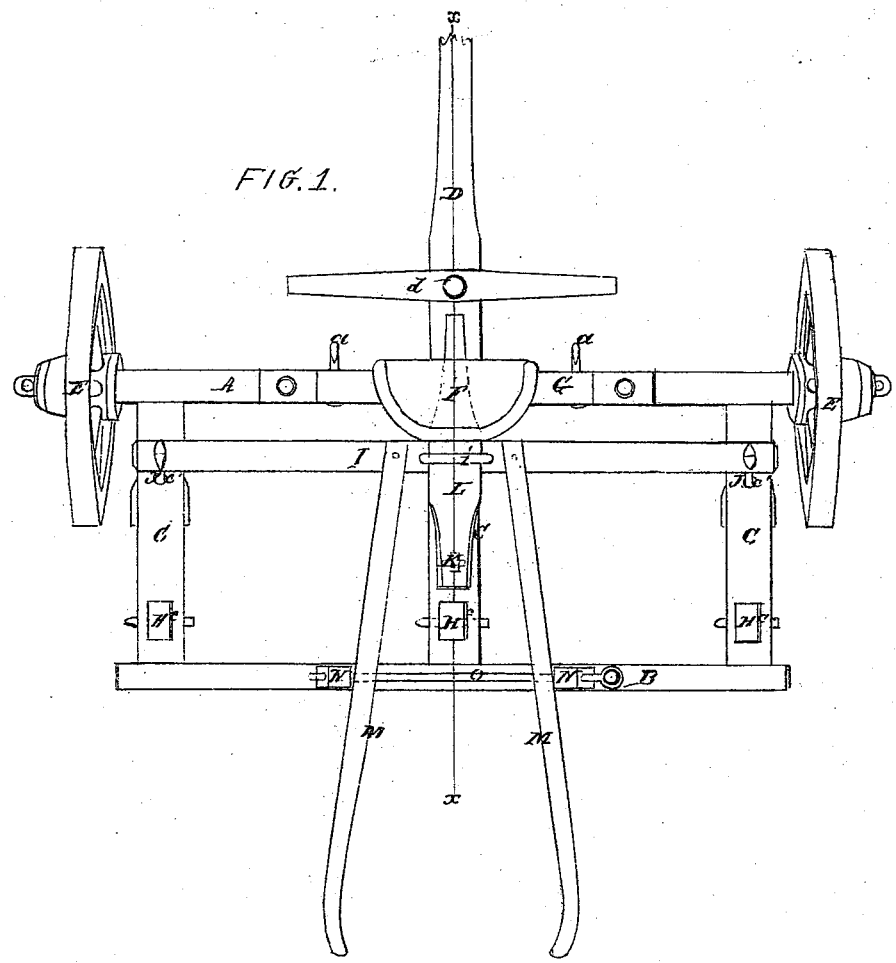
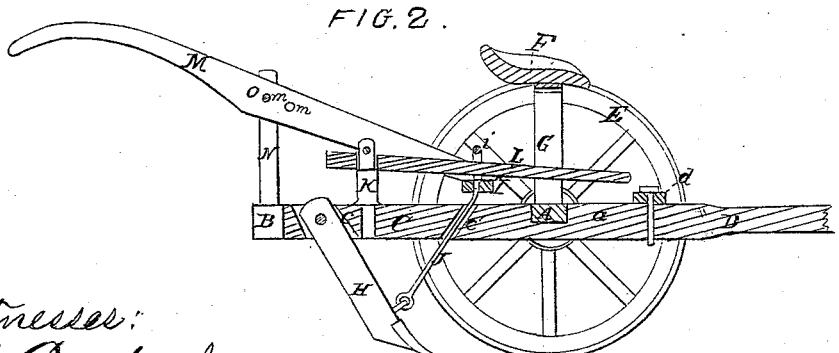
Witnesses:
Wm. H. Brereton Jr.
W. B. Deming
John Roberts
by Knight Bros.
atty.

United States Patent Office.

JOHN ROBERTS, OF GREENFIELD, INDIANA.

*Letters Patent No. 94,032, dated August 24, 1869.*

IMPROVEMENT IN CORN-ROW MARKERS.

The Schedule referred to in these Letters Patent and making part of the same.

*To all whom it may concern:*

Be it known that I, JOHN ROBERTS, of Greenfield, in the county of Hancock, and State of Indiana, have invented a new and useful Improvement in Corn-Row Markers; and I do hereby declare the following to be a full, clear, and exact description of the same, reference being had to the accompanying drawing, which is made a part of this specification.

My invention consists of a sulky-machine for laying off or furrowing "corn-ground," preparatory to planting, of improved construction.

In the drawing—

Figure 1 represents a plan view of my improved machine, and

Figure 2, a longitudinal section on the line $x$–$x$, fig. 1.

The frame proper of my machine, in the preferred form, consists of two transverse pieces, or bars, A B, the former of which constitutes the axletree, and three (more or less) longitudinal pieces, or bars C, a continuation of the middle one of which may form the tongue D, as shown.

This frame is supported on wheels E E, and is adapted to have any required team attached in the ordinary manner, by means of the tongue D, a whiffletree, $d$, and hooks, or staples $a$ $a$.

The customary driver's seat F is supported by means of a bracket, or support, G, attached to the axletree A, or other convenient part of the frame.

The shovels, or markers H (one or more) are pivoted in suitable mortises $c$, in the rear ends of the bars C of the frame, so as to project forward, as shown, and are connected at their lower ends to a common bar, I, by means of rods or links J passing through perforations $c$ in said bars C.

Hinged to a standard, K, projecting from the middle bar C of the frame, is a treadle, or lever, L, adapted to project through and in front of the driver's seat, and connected by a yoke, $i$, or its equivalent, to the bar I, to which the shovels, or markers are attached, for the purpose of enabling the operator to elevate or depress the shovels, or markers from his seat.

To enable these operations to be performed with equal facility from the ground, a pair of "handles," M, is attached to said bar I, and projecting rearwardly therefrom, is pivoted between a pair of standards, N, projecting upward from the rear bar B of the frame, by means of a rod, O, passing through said standards N, and through one of a series of perforations, $m$, in each of the handles M, the plurality of said perforations allowing any desired adjustment of the handles.

Having thus described my invention,

What I claim as new therein, and desire to secure by Letters Patent, is—

The combined arrangement of the frame B C K N, axletree A, wheels E E, driver's seat F, shovels or markers H, rods or links J, bar J, treadle or lever L, and pivoted handles M, substantially as herein set forth, for the purpose specified.

To the above specification of my improvement in corn-row markers, I have signed my hand, this 9th day of February, 1869.

JOHN ROBERTS.

Witnesses:
JACOB T. BARRETT,
B. F. WOOD.